UNITED STATES PATENT OFFICE.

JOHN L. STEWART AND JAMES L. HASTINGS, OF PHILADELPHIA, PENNSYLVANIA, ASSIGNORS, BY MESNE ASSIGNMENTS, TO THE WELSBACH INCANDESCENT GAS LIGHT COMPANY, OF NEW JERSEY.

PROCESS OF PRODUCING REFRACTORY COMPOUNDS.

SPECIFICATION forming part of Letters Patent No. 410,042, dated August 27, 1889.

Application filed December 29, 1885. Serial No. 186,999. (No specimens.)

*To all whom it may concern:*

Be it known that we, JOHN L. STEWART and JAMES L. HASTINGS, citizens of the United States, residing at Philadelphia, in the county of Philadelphia, State of Pennsylvania, have invented certain new and useful Improvements in the Process of Producing Refractory Compounds, of which the following is a specification, reference being had therein to the accompanying drawings.

This invention relates to processes for producing refractory vitreous or crystalline compounds for use in chemical and other arts and for incandescent illumination, said compounds being adapted for molding into articles of various forms and for coating metallic and other articles to protect them from the oxidizing and corroding influences of air, moisture, acids, &c., and from injury by heat. The plastic compound when properly burned or fired is highly refractory, very hard, crystalline in structure, rough on the surface, white or opalescent, and practically infusible.

The principal object of the invention is to produce a readily-incandescing compound capable of resisting the action of intense heat and particularly adapted for forming incandescent burners or attachments for burners for illumination with coal-gas, water-gas, or natural gas.

In carrying out our invention we mix and combine under the influence of a high heat in a gas-furnace or a gas-flame in the open air two or more isomorphous mineral compounds or substances—such as oxides, carbonates, or sulphates—by means of a suitable flux, (preferably a fluoride salt or compound,) so as to produce a new crystalline compound, or two or more mineral substances of different isomorphous groups by means of such a flux, whereby such metallic substances may be brought together in different proportions (without regard to chemical equivalents) and under the proper heat caused to crystallize together without losing their solid form. There is an intimacy of relation existing between the salts of baryta and strontia, lime and magnesia, strontia and lime (in aragonite,) lime and alumina, &c. These and other mineral substances are used in our invention to produce light-giving compounds in different proportions, and are brought together or combined by a flux under the action of heat and crystallized, so that the crystals are separated only with great difficulty.

The salts or compounds of strontia form important ingredients in our incandescing compounds, as they yield a brilliant light at a comparatively-low temperature in the flame of coal-gas, water-gas, or natural gas burned in a Bunsen or other suitable burner, and we use one or more of the strontia compounds—such as the oxide, carbonate, or sulphate—with one or more other mineral compounds or substances and a suitable flux, preferably a fluoride salt—such as calcium fluoride (fluor-spar) or aluminium and sodium double fluoride—in the form of cryolite. We do not, however, confine ourselves to any particular fluoride salt or fluorine compound, but have obtained the best results from those named. A fluoride salt or fluorine compound is an important ingredient as a flux in our light-giving crystalline compound.

The strontium compounds may be combined with the salts or compounds of magnesium, calcium, barium, aluminium, silicium, sodium, potassium, glucinium, zirconium, lithium, zinc, titanium, cadmium, bismuth, uranium, nickel manganese, platinum, and caesium, also with steatite, dolomite, bitter-spar, asbestus, kaolin, &c. We preferably use the strontia compounds with compounds of magnesium, calcium, barium, aluminium, and zirconium.

The materials used are ground dry or in oil or water or glycerine, and the resulting pulverized material is intimately mixed with glycerine or other suitable fluid to the proper consistency for convenient handling or application. The mixture of ingredients having been properly effected, the compound is molded into the desired articles or coated upon articles of metal or other material, and in such forms is subjected to a suitable temperature to drive off the moisture or volatile matter, and then to a high temperature in a gas or other furnace, and may afterward be suspended in a gas-flame or placed in burning gas in the open air for completing the process of burning and for testing and proving the finished articles.

It is to be noted that the important features of our invention in this application are, first, the use of one or more of the strontia compounds with one or more other mineral substances or compounds for forming an incandescing compound; second, the use of a fluorine compound as a flux for causing the union and direct crystallization under heat of two or more crystallizable mineral substances or compounds.

Various mixtures or compounds of the mineral substances above mentioned are made the subjects of applications for patents filed by us jointly and separately, and we make no claim to such compounds in this application.

A composition containing two or more metallic compound substances—such as oxides, carbonates, or sulphates of metals—a flux, a moistening-fluid, and one or more flame or light coloring substances is the sole invention of James L. Hastings, and is described and claimed by him in an application, Serial No. 286,581, filed September 27, 1888.

Having described our invention, what we claim, and desire to secure by Letters Patent, is—

1. The process of producing a refractory crystalline compound, which consists in pulverizing and mixing two or more mineral substances and a fluoride or a fluorine compound, adding a fluid to render the mixture plastic, molding the mixture, and subjecting the molded material to the action of heat, substantially as described.

2. The process of producing a refractory crystalline compound, which consists in pulverizing and mixing a strontium compound or salt with one or more other pulverized mineral substances and a flux, rendering the mixture plastic and molding it into the required form, and then subjecting the molded material to the action of heat, substantially as described.

3. The process of producing a refractory crystalline compound, which consists in pulverizing and mixing a strontium compound or salt with one or more other pulverized mineral substances and with a flux composed of a fluoride or a fluorine compound, then making the mixture plastic and molding it into the required form, then subjecting the molded material to the action of a moderate drying heat, and finally exposing it to a high temperature, substantially as described.

In testimony whereof we affix our signatures in presence of two witnesses.

JOHN L. STEWART.
JAMES L. HASTINGS.

Witnesses:
CHAS. MATHEWS, Jr.,
FRED. SCHUR.